United States Patent [19]

Diaz-Kotti et al.

[11] Patent Number: 5,464,890
[45] Date of Patent: Nov. 7, 1995

[54] POLYESTER MONOFILAMENTS EXTRUDED FROM A HIGH TEMPERATURE POLYESTER RESIN BLEND WITH INCREASED RESISTANCE TO HYDROLYTIC AND THERMAL DEGRADATION AND FABRICS THEREOF

[75] Inventors: Michelle A. Diaz-Kotti, Columbia; Peter J. Brissette, Blythewood, both of S.C.

[73] Assignee: Shakespeare Company, Columbia, S.C.

[21] Appl. No.: 151,406

[22] Filed: Nov. 12, 1993

[51] Int. Cl.$^6$ ................................................ C08K 5/29
[52] U.S. Cl. ..................................... 524/195; 524/539
[58] Field of Search ............................. 524/195, 539

[56] References Cited

U.S. PATENT DOCUMENTS

| | | | |
|---|---|---|---|
| 2,686,180 | 1/1951 | Schmidt et al. | 260/230 |
| 2,901,466 | 8/1959 | Kibler et al. | 260/75 |
| 3,728,287 | 4/1973 | Burmaster | 260/2.3 |
| 3,975,329 | 8/1976 | Barnewall et al. | 260/75 T |
| 4,000,239 | 12/1976 | Hamana et al. | 264/176 F |
| 4,144,285 | 3/1979 | Maschek et al. | 525/437 |
| 4,207,230 | 6/1980 | Bier et al. | 260/45.95 R |
| 4,221,703 | 9/1980 | Hoeschele | 260/45.9 NC |
| 4,284,549 | 8/1981 | Salee | 260/40 R |
| 4,600,743 | 7/1986 | Shizuki et al. | 524/377 |
| 4,639,480 | 1/1987 | Birum et al. | 524/104 |
| 4,670,498 | 6/1987 | Furusawa et al. | 524/381 |
| 4,965,338 | 10/1990 | Tabankia et al. | 528/272 |
| 5,169,499 | 12/1992 | Eagles et al. | 428/175 |
| 5,246,992 | 9/1993 | Wick et al. | 525/437 |
| 5,283,110 | 2/1994 | Gardner et al. | 525/165 |

FOREIGN PATENT DOCUMENTS

WO90/12918  11/1990  WIPO ................. D21F 1/00

OTHER PUBLICATIONS

PCT Polyester for Paper Machine Roles, Eastman Chemical Company Material Safety Data Sheet, approved Sep. 1991, printed Apr. 1993, Eastman pp. 1–6.
Kodar® Thermx™ Copolyester For Dual Ovenable Trays, Eastman Kodak Company, Dec. 1987.
Eastman Polyester Plastics for Packaging, Physical Property Data Sheet, Jan. 1990.
Eastman Plastics, Tentative Data Developmental PCTA Copolyester 6761, Oct. 1986.
Material Safety Data Sheet, Eastman Chemical Products, Inc., Sep. 1990, pp. 1–5.
Material Safety Data Sheet, Eastman Chemical Products, Inc., May 1986.
Stabaxol® KE 7646 Masterbatch, Rhein Chemie Corp.
Stabaxol® KE 8059 Masterbatch, Rhein Chemie Corp.
Material Safety Data Sheet–Stabaxol KE 7646, Rhein Chemie Corp. pp. 1–8.
Material Safety Data Sheet–Staboxol KE 8059, Rhein Chemie Corp. pp. 1–7.

Primary Examiner—Kriellion S. Morgan
Attorney, Agent, or Firm—Renner, Kenner, Greive, Bobak, Taylor & Weber

[57] ABSTRACT

A polyester monofilament is formed from a high temperature polyester resin, a PET resin and a hydrolyric stabilizing agent, and exhibits increased resistance to hydrolytic and thermal degradation. The high temperature polyester resin can be blended with from 0 to about 5 percent by weight of a thermal stabilizing agent. In addition, a masterbatch including the PET resin and hydrolytic stabilizing agent may be compounded prior to blending with the high temperature polyester resin. A fabric may be produced having increased resistance to hydrolytic and thermal degradation and includes a plurality of woven polyester monofilaments, comprising a high temperature polyester resin, a PET resin and a hydrolytic stabilizing agent. Such fabrics have utility as fabrics for the dryer sections of paper making machines.

18 Claims, No Drawings

POLYESTER MONOFILAMENTS EXTRUDED FROM A HIGH TEMPERATURE POLYESTER RESIN BLEND WITH INCREASED RESISTANCE TO HYDROLYTIC AND THERMAL DEGRADATION AND FABRICS THEREOF

TECHNICAL FIELD

The subject invention relates to an extruded monofilament such as may be useful as a component of fabrics for paper making machines. More particularly, the invention relates to a monofilament produced from a blend of a high temperature polyester resin having a melting point greater than about 260° C., polyethylene terephthalate and a carbodiimide stabilizer which blend exhibits an increased resistance to hydrolytic and thermal degradation as compared to monofilaments produced from essentially a high temperature polyester resin and an increased resistance to both thermal and hydrolytic degradation as compared to conventional monofilaments produced from polyethylene terephthalate. The invention also relates to a monofilament produced from a high temperature polyester resin and a masterbatch comprising polyethylene terephthalate and a carbodiimide which monofilament exhibits increased tensile retention after exposure to moisture and elevated temperatures as compared to conventional monofilaments produced essentially from polyethylene terephthalate or high temperature polyester resins and increased dry heat stability as compared to conventional monofilaments produced essentially from polyethylene terephthalate or high temperature polyester resins.

BACKGROUND OF THE INVENTION

Polyester monofilaments having increased resistance to hydrolytic and thermal degradation have long been sought in the monofilament industry. Such monofilaments have been found to be suitable components for use in fabrics in the paper making industry.

Traditionally, these monofilaments have been prepared by melt extruding standard polyester resins such as polyethylene terephthalate (PET). This polyester is well-known in the art and has long been used in the production of monofilaments which are suitable for use in the manufacture of paper machine fabrics. PET has a known melting point of less than 260° C. and can be readily adapted for monofilament use. However, while PET has relatively good dry heat (thermal) stability, it has only moderate hydrolytic stability as compared to polyester resins having higher melt temperatures.

Accordingly, attempts have been made to improve the hydrolytic stability of PET. For example, Barnewall U.S. Pat. No. 3,975,329 indicates that the hydrolytic as well as the thermal stability of PET can be improved by melt extruding this standard polyester resin in the presence of a significant amount of a carbodiimide. Specifically, the patent indicates that the amount of carbodiimide used should be equal to the concentration of carboxyl groups in the original resin plus the concentration of carboxyl groups generated when the original resin is extruded in the absence of carbodiimide.

Notably, high temperature polyester resins having a melting point above about 260° C. have been found to be suitable for use in monofilaments for paper machine fabrics. Such high temperature polyester resins include, but are not limited to poly(cyclohexanedimethylene terephthalate) and poly(cyclohexanedimethylene terephthalate/ isophthalate). The use of poly(1,4-cyclohexanedimethylene terephthalate/isophthalate) and its suitability for use in paper machine fabrics is essentially described in Eagles U.S. Pat. No. 5,169,499. It is referred to as poly(1,4-cyclohexanecarbinyl terephthalate) in this patent. Specifically, the Eagles patent discloses the use of a resin comprising carboxyl groups which are hindered by a moiety selected from cyclic aliphatic and branched aliphatic glycols and is noted as having excellent hydrolytic stability. However, this high temperature polyester resin has lower dry heat (thermal) stability as compared to conventionally stabilized PET.

Notwithstanding these improvements, a need still exists, as a result of the deleterious conditions which paper machine fabrics are subject to during the paper making process, for improved polyester resin blends which may produce suitable monofilaments having improved resistance to both hydrolytic and thermal degradation.

SUMMARY OF INVENTION

It is therefore a primary object of the present invention to provide an extruded polyester monofilament which exhibits increased resistance to both hydrolytic and thermal degradation.

It is another object of the present invention to provide an extruded polyester monofilament, as above, which exhibits improved tensile retention after exposure to moisture and elevated temperatures.

It is yet another object of the present invention to provide an extruded polyester monofilament, as above, which exhibits improved dry heat stability.

It is yet a further object of the present invention to provide a fabric formed from an extruded polyester monofilament which exhibits increased resistance to both hydrolytic and thermal degradation.

At least one or more of these objects, together with the advantages thereof over existing polyester monofilaments and products thereof, which shall become apparent from the specification which follows, are accomplished by the invention as hereinafter described and claimed.

In general, an extruded polyester monofilament which exhibits increased resistance to hydrolytic and thermal degradation according to the present invention includes from about 45 to about 94 percent by weight of a high temperature polyester resin, from about 5 to about 50 percent of polyethylene terephthalate, and from about 1 to about 5 percent by weight of a hydrolytic stabilizing agent.

The present invention also provides a fabric having increased resistance to hydrolytic and thermal degradation which comprises a plurality of woven polyester monofilaments. The polyester monofilaments comprise from about 45 to about 94 percent by weight of a high temperature polyester resin, from about 5 to about 50 percent by weight polyethylene terephthalate, and from about 1 to about 5 percent by weight of a hydrolyric stabilizing agent.

PREFERRED EMBODIMENT FOR CARRYING OUT THE INVENTION

The present invention is directed toward an extruded monofilament which exhibits an improved resistance to both hydrolytic degradation and thermal deterioration as compared to monofilaments currently employed. Inasmuch as no previous polyester monofilaments have been able to maintain both a high level of hydrolytic stability as well as a high level of thermal stability, the unexpected results of the present invention are seen as a substantial improvement over all previous polyester monofilaments. Moreover, as a result of forming the polyester monofilament of the present invention which has both excellent hydrolytic and thermal stability, an unexpected increase in at least one of these properties was discovered above and beyond the hydrolytic and/or thermal stability achieved when such properties were sought from monofilaments having only a high temperature polyester resin or only a polyethylene terephthalate resin incorporated therein.

Specifically, the monofilament of the present invention may be extruded from a homogeneous blend of polyethylene terephthalate (PET), a high temperature polyester resin, hydrolytic stabilizers and optionally, thermal stabilizers. The fact that the novel monofilament exhibits an increased tensile retention after exposure to moisture at elevated temperatures as compared to conventional monofilaments employing a standard polyester resin such as PET is indicative of the increased resistance to hydrolytic degradation. Moreover, the fact that the novel monofilament exhibits an increased dry heat stability over previously known high temperature polyester monofilaments is indicative of the increased resistance to thermal degradation.

The monofilament is extruded from a blend of a high temperature polyester resin, PET resin and a hydrolytic stabilizing agent such as a carbodiimide. Preferably, the monofilament includes from about 45 to about 94 percent by weight of a high temperature polyester resin, from about 5 to about 50 percent by weight PET resin, and from about 1 to about 5 percent by weight of a hydrolytic stabilizing agent. Notably, the PET resin and hydrolyric stabilizing agent may first be compounded to form a masterbatch which is then added to the high temperature polyester resin. When this is done, the masterbatch comprises about 6 to 50 percent by weight of the blend while the high temperature polyester resin comprises about 50 to 94 percent by weight of the blend. Preferably, the masterbatch comprises includes from about 70 to about 98 percent by weight PET resin and from about 2 to about 30 percent by weight hydrolytic stabilizing agent. Also, the high temperature polyester resin may optionally be blended with up to 5 percent by weight of a thermal stabilizing agent with appropriate decreases in the amount of high temperature polyester resin employed prior to being blended with the PET resin and hydrolytic stabilizing agent as more particularly detailed hereinbelow.

Any high temperature polyester resin known in the art and suitable for the conditions presented herein may be utilized in the blend composition of the present invention. By the term "high temperature", it is meant that the polyester resins employed have a melting point of at least about 260° C. Thus, the high temperature polyester resins may include copolyester resins as well as homopolymer polyester resins. Typically such copolyester resins are formed by the reaction of at least two bifunctional acids with at least one bifunctional alcohol, or by the reaction of at least two bifunctional alcohols with at least one bifunctional acid. Homopolymer polyester resins are typically formed by the reaction of one bifunctional acid and one bifunctional alcohol. In other words, the high temperature polyester resins employed in the present invention are those polyesters whose synthesis uses one or more glycols and/or one or more dibasic acids. Preferably, the bifunctional acids include terephthalic and/or isophthalic acid, and the bifunctional alcohols include ethylene glycol and/or cyclohexanedimethanol.

One example of a high temperature polyester resin useful in the present invention is a copolyester produced by the Eastman Kodak Company under the trade names KODAR THERMX Copolyester 13319 or KODAR THERMX Copolyester 6761. Both names are used to identify the same resin. KODAR is a registered trademark of Eastman Kodak Co. for a thermoplastic copolyester resin. This resin is more particularly known as a PCTA copolyester and is believed to have a melt temperature of about 285° C. That is, this polymer is a copolymer of cyclohexanedimethanol and terephthalic acid with isophthalic acid substituted for a portion of the terephthalic acid. The chemical name for this copolyester is poly( 1,4-cyclohexanedicarbinyl terephthalate) or poly(cyclohexanedimethylene terephthalate/isophthalate). This high temperature polyester resin is often used in the production of food trays for microwave and conventional ovens. As noted, about 45 to 94 percent by weight of such a high temperature polyester is added to the monofilament composition, with 80 percent by weight being most preferred.

Other high temperature polyester resins preferably include poly(cyclohexanedimethylene terephthalate), also known as PCT polyester, which is also available from Eastman Kodak Co. under the trade names EASTMAN PCT 3879, PCT 10820, and/or PCT 13787. The PCT polyester is believed to have a melting temperature of about 292° C.

It has been found that these high temperature polyester resins may also be melt-extruded to form monofilaments which exhibit increased resistance to hydrolytic degradation as compared to conventional monofilaments of stabilized PET. However, the high temperature polyester resins are not as thermally stable as PET. In light of this lower thermal stability, the high temperature polyester resin may or may not include a thermal stabilizing agent. The thermal stabilizing agent is typically blended with the high temperature polyester resin prior to the addition of any of the other resins or stabilizers employed in the present invention. Examples of such suitable thermal stabilizing agents include antioxidants such as those found in Tenite P2950-77A, a 99 percent Tenite polypropylene with 1 percent blend of titanium dioxide and a proprietary antioxidant, produced by and a registered trademark of Eastman Chemical Products, Inc.; Thermx 13319-L0001, a proprietary chemical composition believed to be an antioxidant compounded with the KODAR THERMX Copolyester 13319 resin; and Irganox® 1330, a hindered phenol produced by and a registered trademark of Ciba Beigy, Inc. Preferably, from 0 to about 5 percent by weight of such an additive may be blended with the high temperature polyester resin with a corresponding decrease in the amount of high temperature polyester resin used in the present monofilament.

The monofilaments of the present invention also include a polyethylene terephthalate (PET) resin. Notably, PET resins have a melt temperature below 260° C. and are typically formed from ethylene glycol by direct esterification or by catalyzed ester exchange between ethylene glycol and dimethyl terephthalate. However, other processes for producing PET may also be available and are well known in the art. PET is suitable for use in forming monofilaments because it has dimensional stability and low moisture regain, preferred in forming and dryer fabrics.

One example of a PET resin useful in the present invention is produced by E. I. du Pont de Nemours & Co. under the trademark CRYSTAR. This particular PET has a melt temperature of about 257° C. and an intrinsic viscosity of from about 0.75 to 0.95. Preferably, from about 5 to 50 percent by weight of such a polyester resin is added to the monofilament composition, with 17 percent by weight being most preferred.

Furthermore, the monofilament of the present invention also includes a hydrolytic stabilizing agent. Most hydrolytic stabilizing agents are carbodiimides. Preferably, carbodiimides can be selected from the group consisting of bis-carbodiimides corresponding to the formulae R—N=C=N—R and R—N=C=N—R' wherein R and R' are radicals selected from the group consisting of $C_4$-$C_{20}$ substituted and unsubstituted alkyl radicals, substituted and unsubstituted aryl radicals, said substitutions being selected from the group consisting of halogen atoms, nitro groups, amino groups, sulfonyl groups, hydroxyl groups and alkyl and alkoxy radicals and wherein R and R' may or may not be the same. An example of such a compound includes 2,2',6,6'-tetraisopropyldiphenyl carbodiimide, a bis-carbodiimide produced by Rhein-Chemie of Rheinan, Germany under the tradename Stabaxol 1. Other carbodiimides include aromatic polycarbodiimides such as 2,4-diisocyanato- 1,3,5-tris(1-methylethyl) copolymer with 2,6-diisopropyl diisocyanate and benzene-2,4-diisocyanato- 1,3,5-tris(1-methylethyl) homopolymer also produced by Rhein-Chemie under the tradenames Stabaxol P and Stabaxol P100, respectively. Preferably, from about 1 to about 5 percent by weight of such a hydrolytic stabilizing agent is added to the monofilament composition, with 3 percent by weight being most preferred. It will be understood that other compounds may also be employed without departing from the spirit of the invention and that the invention is not necessarily limited to the carbodiimides exemplified. For example, mixtures of these carbodiimides may also be employed.

Moreover, where a masterbatch of polyester resin and hydrolytic stabilizing agent is produced, between about 6 and 50 percent by weight, and preferably 20 percent by weight, may be added to the high temperature polyester resin to form the monofilament composition. As noted hereinabove, the masterbatch may comprise from about 70 to about 98 percent by weight PET resin and from about 2 to about 30 percent by weight hydrolytic stabilizing agent, with a percent ratio of 85 percent PET resin to 15 percent hydrolytic stabilizing agent being most preferred in the masterbatch. An example of such a masterbatch suitable for this invention is available from Rhien Chemie of Rheinan, Germany under the tradename KE8059 and essentially includes a polyester carrier having a mixture of Stabaxol P and Stabaxol P100 incorporated therein in amounts of about 8 percent by weight and 7 percent by weight, respectively, so as to total 15 percent of hydrolytic stabilizing agent in the masterbatch.

Polyester monofilaments prepared according to the present invention have utility in the production of products, such as fabrics for the dryer sections of paper making machines. Thus, a plurality of these monofilaments can be interwoven as is commonly known in the art. Fabrics produced from these polyester monofilaments exhibit increased resistance to hydrolyric degradation which are useful properties in the paper making industry for fabrics or belts.

MONOFILAMENT EXAMPLE

In order to demonstrate practice of the present invention, two monofilaments were prepared and tested for hydrolytic stability (2 tests) and dry heat stability, and the results of these tests are reported hereinbelow. First, a control monofilament, representative of high temperature polyester monofilaments heretofore known in the art, produced from a blend of the high temperature polyester resin, KODAR THERMX Copolyester 13319, about 2.5 percent by weight of the thermal stabilizing agent, Thermx 13319-L0001, and about 1.3 percent by weight of the hydrolytic stabilizing agent, 2,2',6,6'-tetraisopropyldiphenyl carbodiimide (Stabaxol 1), was tested along with a monofilament produced in accordance with the present invention. It will be understood that a high temperature polyester monofilament was employed as the control rather than a standard polyester (PET) monofilament inasmuch as better hydrolytic stability has been obtained with this high temperature polyester monofilament as compared to a standard PET monofilament. However, a PET monofilament comprising about 98.7 percent by PET and about 1.3 percent by weight hydrolytic stabilizing agent 2,2',6,6'-tetraisopropyldiphenyl carbodiimide (Stabaxol 1) was produced for the dry heat (thermal) stability test and the second hydrolytic stability test as detailed herein below.

The monofilament according to the present invention was prepared from a blend of about 80 percent by weight of the high temperature polyester resin, KODAR THERMX Copolyester 13319 and about 20 percent by weight of the KE8059 masterbatch, the masterbatch including about 85 percent by weight PET and about 15 percent by weight of the carbodiimide blend, Stabaxol P/Stabaxol P100. Both the control and novel monofilaments were extruded at elevated temperatures and pressures to produce monofilaments having diameters of about 19.8 mils. Hence, the monofilament of the present invention was produced by substantially the same process of melt extrusion as was the control high temperature polyester monofilament except the maximum draw was raised to 4.1 in order to keep the lines from dragging in the oven.

Upon extrusion into monofilaments, several physical properties were eventually determined for each of the monofilaments, and have been reported in Table I hereinbelow.

TABLE I

| Physical Properties | | |
|---|---|---|
|  | Control Monofilament | Tested Monofilament |
| Tensile, lbs (std. dev.) | 14.7 (0.59) | 13.7 (0.54) |
| Tenacity, gpd (std. dev.) | 3.0 (0.12) | 2.8 (0.11) |
| Elongation at break, % (std. dev.) | 23.5 (3.35) | 24.4 (2.03) |
| Elongation at 1.75, gpd (std. dev.) | 11.4 (0.84) | 12.0 (0.13) |
| Modulus, gpd (std. dev.) | 43.1 (1.03) | 40.9 (1.12) |
| Shrinkage, % (std. dev.) 10 min/205° C. (400° F.) | 7.6 (0.42) | 8.7 (0.08) |
| Knot Strength, lbs | | |
| Average | 9.30 | 9.00 |
| Minimum | 4.80 | 7.20 |
| Standard Deviation | 1.03 | 0.96 |
| Diameter, mil | 19.80 | 19.80 |

Samples of each of the monofilaments produced were then tested for hydrolytic stability. In one test, samples of both the control monofilament and the new "tested" monofilament were exposed to saturated steam at a temperature of about 150° C. (300° F.) and a pressure of about 50 psig for 22 hours each day. In the 2-hour period remaining in the day, data regarding the tensile strength was determined and the percent of tensile retention was calculated. Table II represents this test data over a six-day period as reported hereinbelow.

TABLE II

Hydrolytic Stability - 22 Hour Test

| | PERCENT TENSILE RETENTION | |
|---|---|---|
| Days | Control Monofilament | Tested Monofilament |
| 1 | 100 | 100 |
| 2 | 78.1 | 94.9 |
| 3 | 19.2 | 94.9 |
| 4 | 0 | 82.5 |
| 5 | | 17.5 |
| 6 | | 0 |

As shown in Table II, after only four days, the control monofilament no longer exhibited a percent tensile retention. This is characteristic of most, if not all, other polyester monofilaments. However, the new monofilament of the present invention had a percent tensile retention of 82.5 after four days of the 22-hour test. In fact, as can be seen in Table II, the new monofilament maintained a percent tensile retention until failure at the sixth day. This result clearly shows that the monofilaments of the present invention exhibit an increased resistance to hydrolytic degradation over those high temperature polyester monofilaments presently known in the art.

With respect to the other test for hydrolytic stability, samples of both the control monofilament and the new "tested" monofilament were exposed to saturated steam at a temperature of about 121° C. (250° F.) and a pressure of about 15 psig for the stated number of days shown in Table III. A PET control monofilament was also exposed to the steam at the same temperature and pressure for the same number of days. Each of the samples were tested for tensile strength and the percentage tensile retention exhibited is reported in Table III hereinbelow.

TABLE III

Hydrolytic Stability
(121° C./15 psig saturated steam)

| | PERCENT TENSILE RETENTION | | |
|---|---|---|---|
| Days | Control Monofilament | Tested Monofilament | PET Control Monofilament |
| 4 | 100 | 97.1 | 96.8 |
| 8 | 97.8 | 95.9 | 87.6 |
| 11 | 92.6 | 95.6 | — |
| 14 | 73.3 | 95.3 | 0 |
| 18 | 48.9 | 86.1 | |
| 21 | 46.7 | 92.0 | |
| 25 | 0 | 69.3 | |
| 28 | | 0 | |

As shown in Table III, the PET control monofilament did not exhibit a measurable percent tensile retention after 14 days. In comparison, the control monofilament had a percent tensile retention of 73.3 percent after exposure to saturated steam at about 121° C. (250° F.) after 14 days. The sample of the new monofilament, produced according to the present invention, exhibited a percent tensile retention of 95.3 percent, after exposure to the same conditions for 14 days. After 21 days of exposure to the same steam under the same conditions, the control monofilament exhibited a percent tensile retention of 46.7 percent while the novel monofilament a percent tensile retention of 92 percent. However, after 25 days, the control monofilament did not exhibit a measurable percent tensile retention. The new monofilament still exhibited a percent tensile retention of at least 69.3 percent, however, and did not lose its tensile until at least 28 days.

The results of this test indicate that monofilaments of the present invention exhibit an increase in hydrolytic degradation resistance over what is currently known in the an of high temperature polyester monofilaments and conventional PET monofilaments.

Next, samples of the subject monofilaments were tested with respect to their resistance to thermal degradation. The control PET monofilament, the control monofilament and the new monofilament were placed in an oven such that the monofilaments were subjected to an ambient temperature of about 177° C. (350° F.). Over a fifteen-day period, samples of the monofilaments were removed from the oven and the percent tensile retention was recorded. The results of this test are set forth in Table IV hereinbelow.

TABLE IV

Dry Heat Stability
177° C.

| | PERCENT TENSILE RETENTION | | |
|---|---|---|---|
| Days | Control Monofilament | Tested Monofilament | Control PET Monofilament |
| 0 | 100 | 100 | 100 |
| 3 | 83.6 | 95.6 | 89.3 |
| 4 | 81.5 | 95.6 | — |
| 8 | 56.8 | 90.5 | — |
| 11 | 0 | 78.8 | 64.0 |
| 15 | | 65.7 | 60.9 |

As shown in Table IV, the control monofilament had a percent tensile retention of 81.5 percent and 56.8 percent after 4 and 8 days, respectively. In comparison, the new monofilament had a percent tensile retention of 95.6 percent and 90.5 percent after the same respective periods of time. Furthermore, after 11 days, the control monofilament had 0 percent tensile retention, while the control PET monofilament and the new monofilament maintained a percent tensile retention of 64.0 percent and 78.8 percent, respectfully. In fact, the new monofilament still had a percent tensile retention of 65.7 percent after 15 days, and the control PET monofilament still had a 60.9 percent tensile retention after 15 days.

These test results indicate that monofilaments of the present invention are much more resistant to thermal degradation than monofilaments produced from the high temperature polyester resin and hydrolytic stabilizing agent, even if a thermal stabilizing agent is added to the latter monofilaments. Moreover, it appears that the new monofilament is more resistant to thermal degradation than conventional PET monofilaments as well.

In conclusion, it should be clear from the foregoing example and specification disclosure that the monofilaments of the present invention exhibit improved hydrolyric and thermal stability over conventional polyester or high temperature polyester monofilaments. It is to be understood that the use of thermal stabilizing agents is not required and that when one is employed, it is preferably blended with the high temperature polyester resin. Moreover, the use of the hydrolyric and thermal stabilizing agents are not necessarily limited to the stabilizers disclosed herein and the examples have been provided merely to demonstrate practice of the subject invention. Those skilled in the art may readily select other hydrolytic and thermal stabilizing agents according to the disclosure made hereinabove.

Similarly, practice of the process of the present invention should not be limited to the use of a particular extruder, extrusion temperatures, quench temperature, draw ratio, relaxation or the like that may be employed to extrude monofilament, it being understood by those skilled in the art that accommodations can be made within the spirit of the invention for differences in equipment as well as in the desired composition and physical properties of the monofilament.

Lastly, it should be appreciated that the monofilaments described herein have utility in woven fabric as well as in end-products made therefrom such as paper making belts. Both fabric and related end-products shall have improved hydrolytic and/or thermal stability, over conventional fabrics comprising conventional PET or high temperature polyester monofilaments that have been utilized heretofore in similar embodiments.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. An extruded polyester monofilament comprising:
   from about 45 to about 94 percent by weight of a high temperature polyester resin;
   from about 5 to about 50 percent by weight of a polyethylene terephthalate resin; and
   from about 1 to about 5 percent by weight of a hydrolyric stabilizing agent, wherein said monofilament has increased resistance to hydrolyric degradation as compared to monofilaments consisting essentially of polyethylene terephthalate resin and as compared to monofilaments consisting essentially of high temperature polyester resin, and wherein said monofilament has at least as good a resistance to thermal degradation as compared to monofilaments consisting essentially of polyethylene terephthalate resin and increased resistance to thermal degradation as compared to monofilaments consisting essentially of high temperature polyester resin.

2. An extruded polyester monofilament, as in claim 1, wherein said high temperature polyester resin is formed by the reaction of at least two bifunctional alcohols and at least one bifunctional acid.

3. An extruded polyester monofilament, as in claim 1, wherein said high temperature polyester resin is formed by the reaction of at least two bifunctional acids and at least one bifunctional alcohol.

4. An extruded polyester monofilament, as in claim 1, wherein said high temperature polyester resin is formed by the reaction of at least one bifunctional acid and at least one bifunctional alcohol.

5. An extruded polyester monofilament, as in claim 2, wherein said at least one bifunctional acid is selected from the group consisting of terephthalic acid, isophthalic acid, and mixtures thereof.

6. An extruded polyester monofilament, as in claim 2, wherein said bifunctional alcohols are selected from the group consisting of ethylene glycol, cyclohexanedimethanol, and mixtures thereof.

7. An extruded polyester monofilament, as in claim 3, wherein said bifunctional acids are selected from the group consisting of terephthalic acid, isophthalic acid, and mixtures thereof.

8. An extruded polyester monofilament, as in claim 3, wherein said at least one bifunctional alcohol is selected from the group consisting of ethylene glycol, cyclohexanedimethanol, and mixtures thereof.

9. An extruded polyester monofilament, as in claim 4, wherein said at least one bifunctional alcohol is selected from the group consisting of ethylene glycol and cyclohexanedimethanol, and said at least one bifunctional acid is terephthalic acid.

10. An extruded polyester monofilament, as in claim 1, wherein said high temperature polyester resin is selected from the group consisting of poly(cyclohexanedimethylene terephthalate/isophthalate) and poly(cyclohexanedimethylene terephthalate).

11. An extruded polyester monofilament, as in claim 1, wherein said high temperature resin is blended with up to about 5 percent by weight of a thermal stabilizing agent to form a high temperature polyester blend, with a corresponding decrease in the weight percent of said high temperature polyester resin.

12. An extruded polyester monofilament, as in claim 11, wherein said thermal stabilizing agent is selected from the group consisting of antioxidants.

13. An extruded polyester monofilament, as in claim 1, wherein said hydrolytic stabilizing agent is a carbodiimide selected from the group consisting of biscarbodiimides and polycarbodiimides.

14. An extruded polyester monofilament, as in claim 13, wherein said carbodiimide is selected from the group consisting of benzene-2,4-diisocyanato-1,3,5-tris(1-methylethyl) homopolymer, 2,2',6,6'-tetraisopropyldiphenyl carbodiimide, and a 2,4-diisocyanato-1,3,5-tris(1-methylethyl) copolymer with 2,6-diisopropyl diisocyanate.

15. An extruded polyester monofilament, as in claim 1, wherein said monofilament includes about 80 percent by weight of said high temperature polyester resin, about 17 percent by weight of said PET resin, and about 3 percent by weight of said hydrolytic stabilizing agent.

16. An extruded polyester monofilament, as in claim 1, wherein said PET resin and said hydrolytic stabilizing agent are compounded to form a masterbatch before being added to said high temperature polyester resin.

17. An extruded polyester monofilament, as in claim 16, wherein said masterbatch comprises about 85 percent by weight PET resin and about 15 percent by weight hydrolytic stabilizing agent, said masterbatch comprising about 20 percent by weight of said monofilament.

18. An extruded polyester monofilament, as in claim 1, wherein said monofilament exhibits a measurable percent tensile retention at 25 days, following exposure to saturated steam at a temperature of about 121° C. and a pressure of about 15 psig.

* * * * *